July 31, 1956 R. C. CHATTIN 2,756,833
POWER TAKE-OFF MECHANISM FOR TRACTORS
Filed March 24, 1952 2 Sheets-Sheet 1
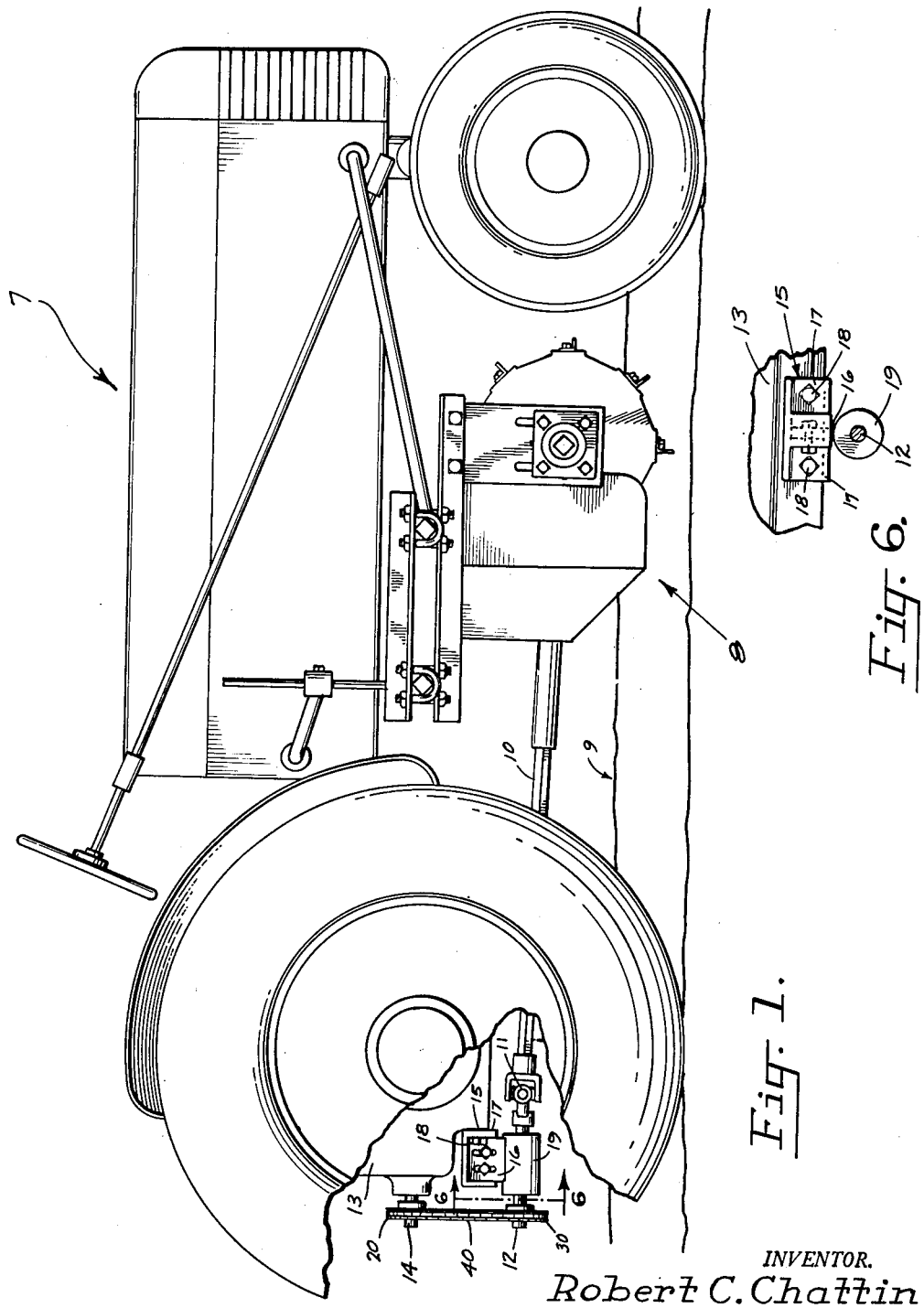
INVENTOR.
Robert C. Chattin
BY
Atty.

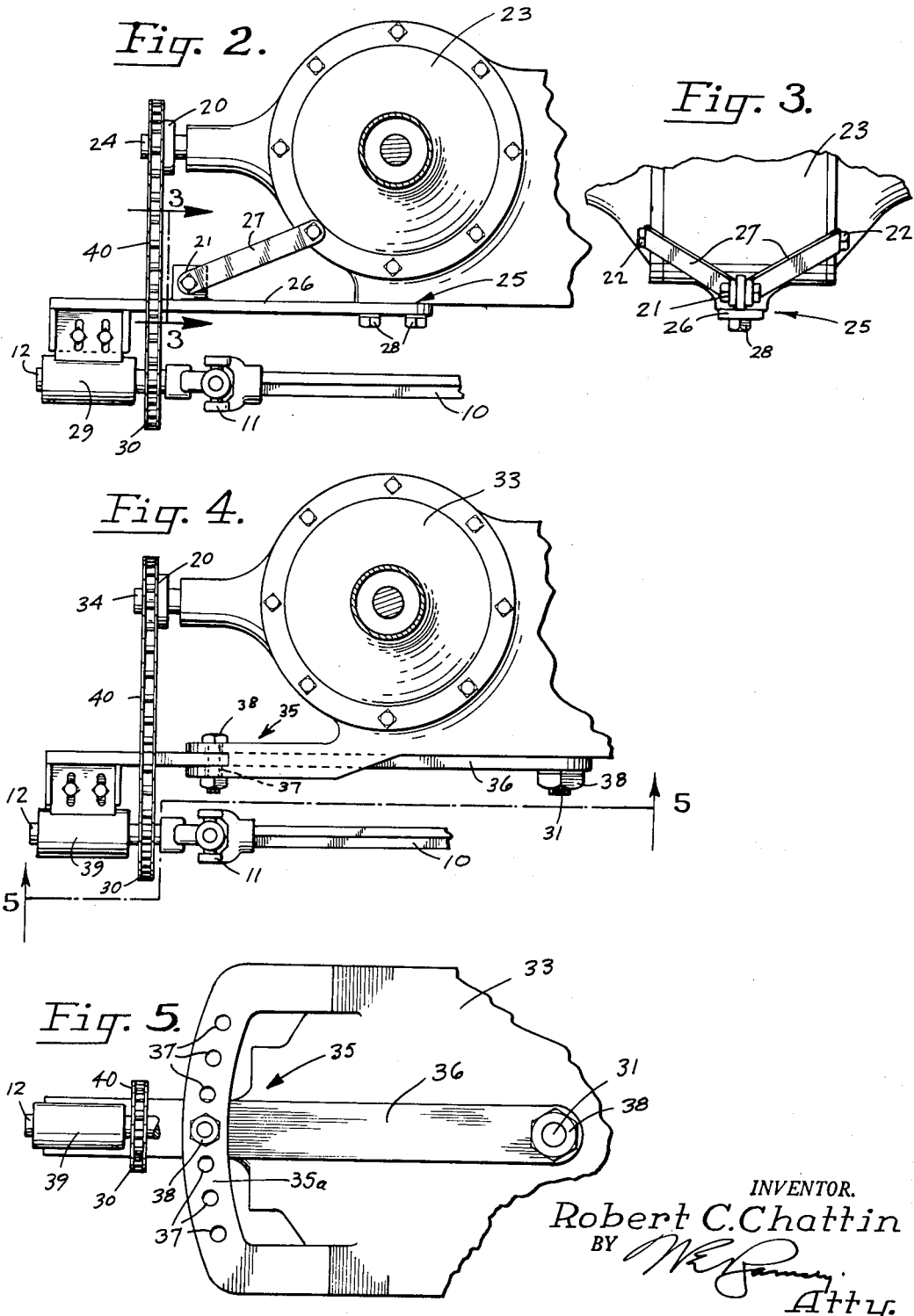

United States Patent Office 2,756,833
Patented July 31, 1956

2,756,833
POWER TAKE-OFF MECHANISM FOR TRACTORS
Robert C. Chattin, Boise, Idaho
Application March 24, 1952, Serial No. 278,256
2 Claims. (Cl. 180—53)

My invention relates to a power transfer mechanism for interconnecting the power take-off shaft of a tractor and the drive shaft of a rotary ground working tool which is carried by the tractor.

One object of my invention is to provide a positive or non-slip type power transfer mechanism of the above description, such mechanism to meet the requirements of structural strength and long life while, at the same time, providing a flexible power linkage whereby lateral movements and vibrations of the ground working tool and associated drive shaft will not be transferred to the power take-off shaft of the tractor. Thus, in contrast with the conventional power transfer mechanism, undue stress and strain will not be imposed upon the power take-off shaft even when the tool is worked in hard, caked or uneven soil.

The particular ground working tool with which the instant invention is of prime utility is a so called "mulcher" or mulching cultivator attachment of the general type found in the United States Patents to Gray, 2,232,523 and Ariens, 2,364,043 and in the copending application of Severance, Ser. No. 83,579, filed March 26, 1949, entitled Row Crop Cultivator, the latter of which I am assignee of one-half interest. This application matured as United States Patent No. 2,694,967 on November 23, 1954. Generally, these mulchers are used in the cultivation of row crops and are suspended from a tractor between the front and rear wheels. Additionally, the attachment is power operated in rotation by the power take-off shaft of the tractor.

During operation of the conventional mulcher, the tractor travels down the rows of crops with the powered attachment straddling the rows of plants so as to mulch, fluff, and cultivate between the rows. In the cultivator art, it is well known that this travel of the tractor and attachment over the ground imparts considerable vibration and undesirable lateral and vertical movement to the attachment. Thus, as the front and rear wheels of the tractor ride upon the ground and as objects are encountered or uneven ground is traversed, the wheels rock the tractor and the attachment so the latter is caused to move limited distances both vertically and laterally of the tractor. It is these rocking and jarring movements and these vibrations, common to all mulching attachments, which bottom the problems and difficulties this invention seeks to overcome. That is to say, the bouncing, rocking, and lateral movement of the cultivator attachment imposes severe strains upon the power transfer mechanism which is driving the cultivator. Experience has shown that these strains often cause the power take-off shaft and associated power transfer structure to fail or to provide efficient operation over but a short life span. Accordingly, it is a particular object of my invention to improve upon those power transfer mechanisms heretofore employed in order that failures may be minimized and the effective life span of both the attachment and the power transfer mechanism may be enhanced.

Heretofore, one of two conventional structures has been employed to power a rotary cultivator attachment of the type above described. With the first of these structures, a strong plane journal bearing has been secured about the power take-off shaft to provide a reinforced support which is concentric with the rotational axis of the power take-off shaft. From this support surface, a pendent bracket is hung and a second journal bearing is mounted on the lower terminal end of the bracket. It is this second journal bearing which carries, supports, and journals, the drive shaft of the attachment. Further, the drive shaft and the power take-off shaft are interconnected by a conventional sprocket and chain mechanism. However, experience has shown that this first structure is not efficient to accomplish the objectives of the instant invention. Thus, the rocking, jarring, and bouncing movements of the attachment drive shaft subject the support surface (the upper plane bearing) to repeated reverse stress and strain which, after a period of time, will damage or break the bearing and/or the power take-off shaft and produce a failure. Further, while this first type of support structure may be strengthened and stiffened by enlarging the capacity thereof, such strengthening involves a substantial expense and the initial attachment of the bearing can be made only at a machine shop or other facility provided with complex machinery and tools or welding equipment. Still further, because this type of power transfer mechanism is mounted directly below the power take-off shaft, it lies centrally of the sides of the tractor and blocks access to the hitch connection. Thus, the entire mechanism must be disassembled and removed when the tractor is to be used for other purposes.

The second conventional power transfer mechanism provides a cantilever or pendent type support which is secured directly to the frame of the tractor and which projects laterally to one side thereof to carry a journal bearing for the drive shaft of the attachment. With this structure, also, the power take-off shaft and drive shaft are interconnected with an endless chain mechanism. Here again, however, certain dificiencies are apparent. Thus, while access to the hitch connection of the tractor is not obscured by this oblique drive arrangement, the cantilever type support is weak and a positive or nonslip power transfer is not provided. Further, to attach this mechanism to the frame of the tractor, either holes must be bored and tapped in the frame to receive attachment bolts or the support mechanism must be welded directly to the tractor frame. Either of these attachment methods is of sufficient complexity to require machine shop or welding facilities not immediately available to the farmer or rancher located in those regions where rotary cultivators are in common use.

In view of the above conventional power transfer mechanisms and the deficiencies inherent therein, it is one object of my invention to provide an improved transfer mechanism and physical support for the drive shaft of a rotary cultivator, which support is sturdy and strong and which transfer mechanism will have a long useful life, will transfer little or no movement and stress to the power take-off shaft, and will be inexpensive to fabricate, and which can be attached or installed without the use of welding or machine shop facilities.

A great variety of tractors today are on the market. In general, however, these possess similar structural characteristics in that the power take-off shaft extends rearwardly from the differential housing and a hitch connection is made integral with or detachably is secured to the lower portion of the differential housing. Because of the use to which the hitch connection is put, most tractor manufacturers purposely and necessarily provide structural strength and stiffness at this point. Thus, while the structural details of the hitch connection may vary from tractor to tractor, a common attribute of a vast majority of all connections is their rugged strength and sturdiness which is essential when the tractor tows a cultivator, planter, or similar attachment.

Having in mind the inherent strength of the hitch connection on a tractor, it is a further object of my invention to utilize this connection and this strength for mounting my power transfer mechanism and for supporting the drive shaft of a rotary cultivator attachment.

To the above ends, I take advantage of the fact that the power take-off shaft is arranged above the hitch connection and both are arranged centrally in a lateral direction of the tractor. Thus, I mount one of a mated pair of aligned sprockets on the power take-off shaft and one on the drive shaft and I interconnect these sprockets with an endless flexible chain. Further, a bracket member detachably is secured to the hitch connection so as to utilize the strength of the latter. Still further, the bearing in which the drive shaft is journaled is carried pendent from this bracket so the only support for the bearing and for the drive shaft of the attachment is provided by the structurally superior hitch connection. With this mechanism the stress and strain which result from the rocking and vibrational movements of the cultivator attachment are taken by the strong hitch connection and the endless flexible chain provides a positive or nonslip type power transfer which will yield in compression or lateral movement. Thus, little or no strain is imposed upon the power take-off shaft of the tractor. Further, my power transfer mechanism can be fabricated, as a unit, for ready and quick attachment to a tractor with bolts or nuts only. Thus, no machine shop facilities or welding equipment are required and the simplicity of the attachment procedure requires a minimal mechanical knowledge.

Other objects and advantages will appear in the following description of the preferred embodiment of my power transfer mechanism, as illustrated in the accompanying drawings, wherein:

Fig. 1 is a side view, partially broken away, of a typical tractor having a rotary cultivator attachment secured thereto, the broken portion of the figure revealing a first species of the power transfer mechanism of my invention;

Figs. 2 and 3 are related side and rear detail views, Fig. 3 being taken substantially on the line 3—3 of Fig. 2, showing a second species of my power transfer mechanism;

Figs. 4 and 5 are related side and bottom detail views, Fig. 5 being taken substantially on the line 5—5 of Fig. 4, showing a third species of my invention; and Fig. 6 is a detail view, taken substantially on the line 6—6 of Fig. 1, further illustrating the structure of the first species of my invention.

In the drawings, I have shown three separate species for the reason that the structural details of the invention will vary in accord with the structural details of that particular tractor upon which my power transfer mechanism is mounted. More particularly, each of the three illustrated species is shown secured to and supported from the hitch connection of a tractor. Various manufacturers provide various locations for and various types of hitch connections. In practice, then, I manufacture as many transfer mechanisms as there are diverse hitch connections. In general, however, a common attribute of all modern hitch connections is that they are located centrally of the sides of the tractor and are mounted upon the lower portion of the differential housing.

In Fig. 1, I have shown a tractor 7 carrying a rotary cultivator attachment or "mulcher" 8 and positioned to straddle a row crop planting area 9. In order to provide a positive or non-slip type drive for the mulcher 8, in contrast with a belt or non-positive type drive, an elongated rotatable drive shaft member 10 is geared thereto.

Progressing rearwardly of the tractor (to the left in Fig. 1), the drive shaft 10 includes a universal joint 11 and a stub shaft 12 which rotate as a unit. Further, as conventional with a rear drive tractor, a differential housing 13 has a journaled power take-off shaft 14 extending rearwardly therefrom. Additional conventional structure includes a hitch connection, indicated at 15. In the tractor under consideration, the hitch connection 15 takes the form of a flat vertical area which is pierced by two spaced and tapped holes. In the drawing, the hitch beam or other attachment structure (by which a cultivator, planter, or the like is attached to this hitch connection) has been removed. In place thereof, a short bracket 16 having a laterally extending plate portion 17 has been detachably secured to the hitch connection by means of two spaced bolts 18. The bracket 16 serves to carry an elongated pendent journal bearing 19 in which the end of the drive shaft 10, 12 rotatably is journaled, supported, and carried.

As a further link in the positive or nonslip type power transfer mechanism, a first or upper sprocket wheel 20 is mounted upon the end of the power take-off shaft 14 for rotation therewith. Additionally, a second or lower sprocket 30 is mounted upon the drive shaft 10, 12 for rotation with the latter. As can be seen, these sprockets 20 and 30 are aligned one with another both laterally and longitudinally and are arranged centrally of the sides of the tractor in accord with this same central location of the power take-off shaft 14 and the hitch connection 15.

To complete the positive power transfer mechanism, an endless flexible chain 40 is reeved about and interconnects the sprockets 20 and 30. Thus, when the power take-off shaft 14 is actuated in rotation, the sprockets and chain cause the drive shaft 10, 12 to be rotated in actuation of the cultivator attachment 8. During such operation, the previously mentioned rocking, jarring, and vibrational movement of the cultivator attachment 8 will be generated. However, it will be noted that the instant power transfer mechanism is not secured to the power take-off shaft 14, but rather detachably is secured to the hitch connection 15 where strength and sturdiness purposely have been provided by the tractor manufacturer. Thus, the powered transfer mechanism will not break or fail under the repeated reverse stress and strain imposed by normal operation. Further, the endless flexible chain 40 will give or will move should any slight lateral or vertical (upward) movement be impressed upon the stub shaft 12 and lower sprocket 30 by a severe jolt of the tractor or mulcher. This latter movement or give, of course, is accommodated by the flexible nature of the chain 40. In short, the flexible nature of the chain 40 allows a positive or nonslip type power transfer to be effected without the imposition of undue stress and strain upon the power take-off shaft 14. Thus, the power take-off is required to withstand only those forces for which it was designed.

The second species of my invention is shown in Figs. 2 and 3 together with the aforementioned drive shaft 10, the universal joint 11, the stub shaft 12 and associated mechanism. With this species, a somewhat different type of differential housing 23 and hitch connection 25 are shown. The power take-off shaft 24, the sprockets 20 and 30, and the endless flexible chain 40 are similar to those of the previously described species, however.

In particular, that hitch connection 25 which is illustrated in Figs. 2 and 3 has been selected for exemplary purposes because it has been found to possess a minimal strength. Accordingly, an elongated bracket 26 has been secured thereto, as with the bolts 28, and a pair of brace members 27 has been added. These brace members 27 are joined, at one common end, to an intermediate portion 21 of the elongated bracket 26 and, at their outer divergent ends, to a pair of laterally spaced attachment points 22 on the differential housing 23. Thus, the brace members serve as an additional lateral support for the elongated bracket 26, such support being required only on one tractor now on the market, of which I am aware.

The bracket 26 carries an elongated journal bearing 29 at the rear end thereof. This bearing is located to the rear of the sprocket 30 in contrast to the opposite location of the first species. However, the operation and the end result is the same with both species. Thus, actuation of the power take-off shaft 24 will rotate the drive shaft 10, 12 via the two sprockets 20 and 30 and the endless flexible chain 40. Again, the flexible chain 40 provides a positive or nonslip type power transfer mechanism which gives under the influence of a vertical stress upwardly or to the side. Further, the bulk of the power transfer mechanism is secured to and is pendent from the hitch connection 25 so that no stress or strain is imposed upon the power take-off shaft when the drive shaft of the mulcher is jarred or moved.

The third species of my invention, illustrated in Figs. 4 and 5, again originates with a differential housing 33 having a power take-off shaft 34 extending rearwardly therefrom and a hitch connection 35 carried on the bottom portion thereof. This particular hitch connection 35, however, includes a bifurcated arcuate support 35a which extends rearwardly and laterally of the differential housing 33 and is pierced by a plurality of apertures 37. Additionally, a protruding threaded shaft 31 is provided at a point spaced from the apertures 37. Thus, I provide an elongated bracket 36 which is straddled by the bifurcated support of the hitch connection 35 and detachably is secured both to the latter and to the protruding threaded shaft 31 by means of appropriate nut means 38. With this species of the invention, the term "hitch connection" includes the threaded shaft 31 since this shaft normally is used for the attachment of other farm machinery to the tractor.

As with the previous two species, the elongated bracket 36 carries a pendent journal bearing 39 in which the drive shaft 10, 12 is journaled and supported. Thus, actuation of the power take-off shaft 34 will rotate the drive shaft through the endless flexible chain 40 and the two sprockets 20 and 30. Here again, the power transfer is of the positive type and the hitch connection 35 of the tractor has been utilized as the sole support so that little or no stress can be imposed upon the power take-off shaft.

As a common attribute of all three of the above described species, the hitch connection on the tractor has been used as a support so the farmer or rancher may assemble or disassemble both the power transfer mechanism of the invention and the rotary cultivator attachment 8 without the use of special tools or welding equipment. That is to say, each of the described power transfer mechanisms is attached with a nut and/or a bolt structure so that only a wrench need be employed. Further, since the tractor manufacturer has made the hitch connection strong and sturdy purposely, rocking, jarring, and lateral movement of the cultivator attachment and drive shaft will not and cannot be transferred to the power take-off shaft of the tractor. This latter feature is enhanced by the flexible nature of the chain 40 which will give in compression or in lateral movement. Thus, I have provided a physical support for the drive shaft of the cultivator attachment, which support is sturdy, will impose little or no stress upon the power take-off shaft of the tractor, is inexpensive to fabricate, and can be assembled by a farmer or rancher in a remote area with a wrench only as a tool.

I claim:

1. In combination with a differential housing member having a power take-off shaft extending rearwardly therefrom and having a hitch connection on the lower portion thereof, said power take-off shaft and hitch connection being arranged with the take-off shaft above the connection, an independent drive shaft member arranged vertically below and centrally, in a lateral direction, of said housing and extending forwardly of said differential housing member, said drive shaft and said power take-off shaft each carrying one of a mated pair of aligned sprockets, a power transfer means detachably interconnecting said sprockets to power the drive shaft from the power take-off shaft, said means including an endless chain trained over said aligned sprockets, a bracket member detachably secured solely to said hitch connection, a bearing mounted upon said bracket, said drive shaft being journaled in and supported by said bearing, said bracket member extending rearwardly of the differential housing and being elongated, said hitch connection including a pivot member protruding from the bottom portion of said differential housing, a bifurcated support extending rearwardly and laterally of the housing member and straddling said bracket member intermediate the ends of the latter, one end of said elongated bracket member being secured detachably from said pivot member protruding from the bottom portion of said differential housing and the other end carrying said journaled bearing.

2. In combination, a rear drive tractor having a differential housing with a hitch connection on the bottom thereof, a power take-off shaft arranged centrally of the sides of the tractor and extending rearwardly from said differential housing above said hitch connection, a rotatably driven ground working tool supported from a forward portion of said tractor forward of said differential housing and having an elongated drive shaft extending rearwardly therefrom past and directly below said hitch connection, a first sprocket means mounted upon the terminal end of said power take-off shaft for rotation therewith, a second sprocket means carried by said drive shaft for rotation therewith, said sprockets both being arranged centrally of the sides of said tractor and being aligned one with another both laterally and longitudinally, an endless flexible chain interconnecting said first and second sprocket means, a bracket member detachably secured at spaced points solely to said hitch connection, and an elongated journal bearing carried pendently by said bracket member, said elongated bearing having its longitudinal axis arranged parallel to the axes of rotation of said sprockets and in alignment longitudinally with the axis of rotation of the end of said drive shaft, the said end of the drive shaft being journaled in said journal bearing, said bracket member and flexible chain being the only support for the said journal bearing and end of the drive shaft, said bracket member being elongated and said hitch connection including a threaded pivot member protruding from the bottom portion of said differential housing and a bifurcated support extending rearwardly from the differential housing and straddling said bracket member intermediate the ends thereof, the front end of said elongated bracket member being secured with a threaded nut detachably to said threaded pivot member protruding from the bottom of said differential housing and the rear end thereof carrying said journal bearing, said bifurcated support and elongated bracket member being secured detachably one to the other intermediate the ends of the bracket member.

References Cited in the file of this patent

UNITED STATES PATENTS

| | | |
|---|---|---|
| 1,408,057 | Zimmer | Feb. 28, 1922 |
| 1,496,999 | Ray | June 10, 1924 |
| 1,573,359 | Ruckstell | Feb. 16, 1926 |
| 1,654,106 | Allensworth | Dec. 27, 1927 |
| 2,269,980 | MacDonald | Jan. 13, 1942 |
| 2,289,598 | Sladecek | July 14, 1942 |
| 2,328,838 | Oberlink | Sept. 7, 1943 |
| 2,496,469 | Hilblom | Feb. 7, 1950 |
| 2,528,784 | Rich | Nov. 7, 1950 |
| 2,533,804 | Hitchcock | Dec. 12, 1950 |
| 2,551,725 | Christiansen | May 8, 1951 |
| 2,618,350 | Von Ruden | Nov. 18, 1952 |
| 2,622,383 | Colvin | Dec. 23, 1952 |
| 2,624,416 | Larsen | Jan. 6, 1953 |